(12) United States Patent
Udagawa et al.

(10) Patent No.: US 7,947,762 B2
(45) Date of Patent: May 24, 2011

(54) AQUEOUS INK, INK JET RECORDING METHOD, INK CARTRIDGE, RECORDING UNIT AND INK JET RECORDING APPARATUS

(75) Inventors: Masako Udagawa, Kawasaki (JP); Shinichi Hakamada, Kawasaki (JP); Takashi Imai, Kawasaki (JP); Kenji Moribe, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/562,733

(22) Filed: Sep. 18, 2009

(65) Prior Publication Data

US 2010/0010157 A1  Jan. 14, 2010

Related U.S. Application Data

(62) Division of application No. 11/550,473, filed on Oct. 18, 2006, now abandoned.

(30) Foreign Application Priority Data

Oct. 28, 2005 (JP) ................................. 2005-314709

(51) Int. Cl.
  *C09D 11/00* (2006.01)
  *B01J 13/00* (2006.01)
(52) U.S. Cl. ....................................... 523/160; 524/557
(58) Field of Classification Search ................ 523/160, 523/161; 524/557
See application file for complete search history.

(56) References Cited

U.S. PATENT DOCUMENTS

| | | | |
|---|---|---|---|
| 4,597,794 A | 7/1986 | Ohta et al. | 106/20 |
| 5,085,698 A | 2/1992 | Ma et al. | 106/20 |
| 5,160,370 A | 11/1992 | Suga et al. | 106/20 |
| 5,221,334 A | 6/1993 | Ma et al. | 106/20 D |
| 5,272,201 A | 12/1993 | Ma et al. | 524/505 |
| 5,519,085 A * | 5/1996 | Ma et al. | 524/503 |
| 5,702,510 A | 12/1997 | Yoshida et al. | 106/31.6 |
| 5,782,967 A | 7/1998 | Shirota et al. | 106/31.58 |
| 6,036,307 A | 3/2000 | Hakamada et al. | 347/106 |
| 6,214,963 B1 | 4/2001 | Noguchi et al. | 528/71 |
| 6,398,355 B1 | 6/2002 | Shirota et al. | 347/100 |
| 6,474,803 B1 | 11/2002 | Shirota et al. | 347/100 |
| 6,552,156 B2 | 4/2003 | Noguchi et al. | 528/71 |
| 6,619,791 B2 | 9/2003 | Tochihara et al. | 347/100 |
| 6,676,254 B2 | 1/2004 | Nagashima et al. | 347/100 |
| 6,698,876 B2 | 3/2004 | Sato et al. | 347/100 |
| 6,723,137 B1 | 4/2004 | Hakamada et al. | 8/549 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,125,111 B2 | 10/2006 | Udagawa et al. | 347/100 |
| 7,141,105 B2 | 11/2006 | Udagawa et al. | 106/31.49 |
| 7,144,449 B2 | 12/2006 | Udagawa et al. | 106/31.15 |
| 7,185,978 B2 | 3/2007 | Nagashima et al. | 347/100 |
| 7,195,340 B2 | 3/2007 | Nagashima et al. | 347/56 |
| 7,208,032 B2 | 4/2007 | Hakamada et al. | 106/31.27 |
| 2003/0098904 A1 * | 5/2003 | Katsuragi et al. | 347/100 |
| 2003/0189627 A1 | 10/2003 | Kawamura et al. | 347/100 |
| 2004/0106698 A1 * | 6/2004 | Lee et al. | 523/160 |
| 2005/0088501 A1 | 4/2005 | Nagashima et al. | 347/100 |
| 2005/0204955 A1 | 9/2005 | Nagashima et al. | 106/31.59 |
| 2005/0219341 A1 | 10/2005 | Nito et al. | 347/100 |
| 2005/0228069 A1 * | 10/2005 | Kataoka et al. | 523/160 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0021545 A1 | 2/2006 | Nagashima et al. | 106/31.27 |
| 2006/0089423 A1 * | 4/2006 | Ueno et al. | 523/160 |
| 2006/0098067 A1 | 5/2006 | Imai et al. | 347/100 |
| 2006/0098068 A1 | 5/2006 | Hakamada et al. | 347/100 |
| 2006/0100311 A1 | 5/2006 | Tokuda et al. | 523/160 |
| 2006/0103704 A1 | 5/2006 | Hakamada et al. | 347/100 |
| 2006/0125895 A1 | 6/2006 | Nito et al. | 347/100 |
| 2006/0192827 A1 | 8/2006 | Takada et al. | 347/100 |
| 2006/0196389 A1 | 9/2006 | Tsuji et al. | 106/31.43 |
| 2006/0234018 A1 | 10/2006 | Nagashima et al. | 428/195.1 |
| 2007/0029522 A1 | 2/2007 | Udagawa et al. | 252/301.16 |
| 2007/0034114 A1 | 2/2007 | Udagawa et al. | 106/31.15 |
| 2007/0097155 A1 | 5/2007 | Imai et al. | 347/1 |
| 2007/0112095 A1 | 5/2007 | Moribe et al. | 523/160 |
| 2007/0134451 A1 | 6/2007 | Hakamada et al. | 428/32.38 |

FOREIGN PATENT DOCUMENTS

| | | |
|---|---|---|
| EP | 1 291 397 A1 | 3/2003 |
| JP | 5-179183 | 7/1993 |

OTHER PUBLICATIONS

European Search Report and Written Opinion in European Patent Application No. 06 12 2412.

* cited by examiner

*Primary Examiner* — Basia Ridley
*Assistant Examiner* — Alexander C Kollias
(74) *Attorney, Agent, or Firm* — Fitzpatrick, Cella, Harper & Scinto (57) ABSTRACT

The invention provides an aqueous ink comprising a polymer having hydroxyl groups and a pigment, which can provide images excellent in scratch resistance and highlighter resistance and can inhibit the seeping out phenomenon of the polymer and the deterioration of storage stability and ejection characteristics even when it is stored for a long period of time. The aqueous ink comprises a polymer having hydroxyl groups and a pigment, wherein a proportion of a content of a polymer that is not adsorbed on the pigment out of the polymer having hydroxyl groups to the content of the pigment in the ink is 2.0 mass % or more, and a content (mass %) of the polymer that is not adsorbed on the pigment out of the polymer having hydroxyl groups is 0.20 mass % or less based on the total mass of the ink.

2 Claims, 4 Drawing Sheets

FIG. 8

AQUEOUS INK, INK JET RECORDING METHOD, INK CARTRIDGE, RECORDING UNIT AND INK JET RECORDING APPARATUS

This application is a division of application Ser. No. 11/550,473 filed Oct. 18, 2006 now abandoned.

BACKGROUND OF THE INVENTION

1. Field of the Invention

The present invention relates to an aqueous ink comprising a polymer and a pigment.

2. Description of the Related Art

It has been known to use a pigment as a coloring material of an ink in order to make excellent the fastness properties, such as light fastness, gas fastness and water fastness, of an image obtained by an ink jet recording method. It has also been known to use in an ink a resin dispersion pigment that is dispersed with a polymer as a dispersant, or a self-dispersible pigment to the surface of which an hydrophilic group is bonded and a water-soluble polymer in order to improve the scratch resistance and highlighter resistance of an image (Japanese Patent Application Laid-Open No. H05-179183).

SUMMARY OF THE INVENTION

The present inventors have carried out a detailed investigation as to inks comprising a resin dispersion pigment with a view toward improving the fastness properties, such as light fastness, gas fastness and water fastness, of an image obtained by an ink jet recording method as well as the scratch resistance and highlighter resistance thereof. As a result, it has been found that the ejection characteristics of the inks are greatly affected by the type or properties of a polymer functioning as a dispersant.

Thus, the present inventors have carried out a further detailed investigation as to polymers used as dispersants for the purpose of making excellent the fastness properties, scratch resistance and highlighter resistance of images as well as the ejection characteristics of inks. As a result, it has been found that an ink in which a pigment is dispersed with a polymer having hydroxyl groups can solve the above-described problems.

However, it has been found that when an ink cartridge stored therein with an ink in which a pigment is dispersed with a polymer having hydroxyl groups is installed in an ink jet recording apparatus and then is left to stand for a long period of time without ejecting the ink, the following new technical problem is raised. Namely, it has been found that the polymer in the ink seeps out through ejection orifices of a recording head, adheres in the vicinity of the ejection orifices and then sticks there, thereby the ejection characteristics are deteriorated.

Accordingly, it is an object of the present invention to provide an aqueous ink (hereinafter may also be referred to as "ink") capable of solving the following problems when the aqueous ink comprising a resin dispersion pigment that is dispersed with a polymer having hydroxyl groups as a dispersant. In other words, the object is to provide an aqueous ink that can provide images excellent in scratch resistance and highlighter resistance and can inhibit the seeping out phenomenon of the polymer and the deterioration of ejection characteristics even when it is stored for a long period of time.

Another object of the present invention is to provide an ink cartridge, a recording unit and an ink jet recording method using the above-described aqueous ink.

The above objects can be achieved by the present invention described below. More specifically, an aqueous ink according to the present invention comprises a polymer having hydroxyl groups and a pigment, wherein a proportion of a content of a polymer that is not adsorbed on the pigment out of the polymer having hydroxyl groups to a content of the pigment in the ink is 2.0 mass % or more, and wherein a content (mass %) of the polymer that is not adsorbed on the pigment out of the polymer having hydroxyl groups is 0.20 mass % or less based on the total mass of the ink.

The ink jet recording method according to another embodiment of the present invention is an ink jet recording method comprising ejecting an ink by an ink jet method to conduct recording on a recording medium, wherein the ink is the aqueous ink of the above-described constitution.

The ink cartridge according to a further embodiment of the present invention is an ink cartridge comprising an ink storage portion storing an ink, wherein the ink is the aqueous ink of the above-described constitution.

The recording unit according to a still further embodiment of the present invention is a recording unit comprising an ink storage portion storing an ink and a recording head for ejecting the ink, wherein the ink is the aqueous ink of the above-described constitution.

The ink jet recording apparatus according to a yet still further embodiment of the present invention is an ink jet recording apparatus comprising an ink storage portion storing an ink and a recording head for ejecting the ink, wherein the ink is the aqueous ink of the above-described constitution.

According to the present invention, there can be provided an aqueous ink capable of solving the following problems when using the aqueous ink comprising a resin dispersion pigment that is dispersed with a polymer having hydroxyl groups as a dispersant. In other words, there can be provided an aqueous ink that can provide images excellent in scratch resistance and highlighter resistance and can inhibit the seeping out phenomenon of the polymer and the deterioration of storage stability and ejection characteristics even when it is stored for a long period of time.

According to another embodiment of the present invention, there can be provided an ink cartridge, a recording unit and an ink jet recording method using the above-described aqueous ink.

Further features of the present invention will become apparent from the following description of exemplary embodiments with reference to the attached drawings.

DESCRIPTION OF THE EMBODIMENTS

The present invention will hereinafter be described in more detail by the best mode for carrying out the invention.

The present inventors have carried out a detailed investigation as to inks comprising a resin dispersion pigment with a view toward improving the scratch resistance and highlighter resistance of images obtained by an ink jet recording method. The inventors have supposed that the ejection characteristics can be improved by enhancing the hydrophilicity of a pigment, and thus carried out an investigation as to the use of a polymer having hydroxyl groups as a dispersant for the resin dispersion pigment further. However, it has been found that when an ink cartridge stored therein an ink containing a resin dispersion pigment dispersed with a polymer having hydroxyl groups is installed in an ink jet recording apparatus and then is left to stand for a long period of time without ejecting the ink, the following problem is raised. In other words, it has been confirmed that a phenomenon that the polymer in the ink seeps out through ejection orifices of a recording head occurs. Thus, the present inventors have carried out an investigation as to causes of the above phenomenon. As a result, the inventors have concluded that the following phenomenon caused within a nozzle of the recording head is one of the causes. The mechanism with which the polymer seeps out will hereinafter be described in detail with reference to FIGS. 1A, 1B and 1C.

Figure 1A:
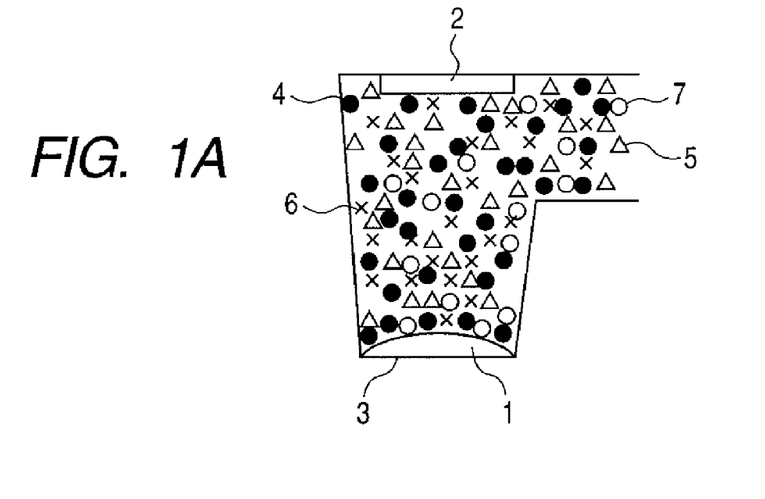
FIGS. 1A, 1B and 1C typically illustrate the condition that the state of an ink changes with time within a nozzle.
Figure 1B:
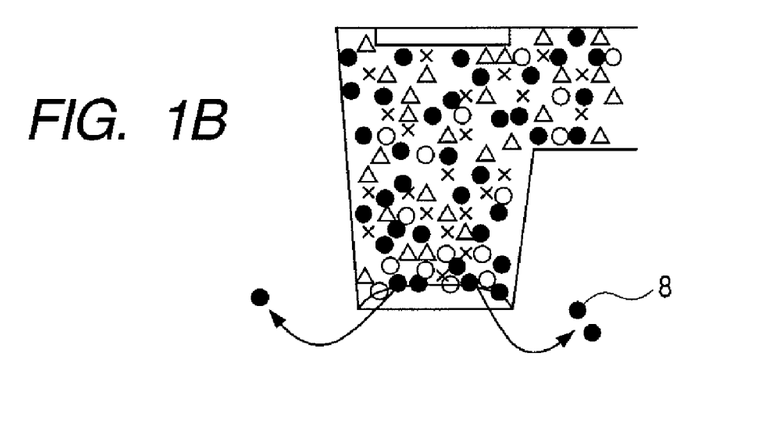
Figure 1C:
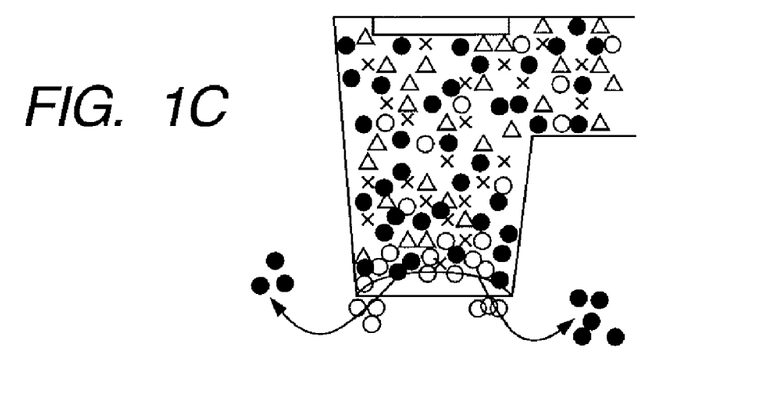

FIGS. 1A, 1B and 1C typically illustrate the condition that the state of an ink containing a resin dispersion pigment dispersed by a polymer having hydroxyl groups changes with time within a nozzle.

FIG. 1A illustrates a state after the ink has been ejected from an ejection orifice 1 by thermal energy applied from a heater 2. As illustrated in FIG. 1A, water molecule 4, pigment particle 5 on which the polymer has been adsorbed, a water-soluble organic solvent 6, and a polymer having hydroxyl groups that is not adsorbed on the pigment (a free polymer 7 having hydroxyl groups) are present within the nozzle in a uniformly dispersed state. Incidentally, in the present invention, a polymer that is not adsorbed on the pigment is referred to as "free polymer", and a polymer having hydroxyl groups in a state not adsorbed on a pigment is referred to as "free polymer having hydroxyl groups".

FIG. 1B illustrates a state after left to stand for a certain period of time with the state of FIG. 1A. As illustrated in FIG. 1B, water first evaporates from the ejection orifice 1 within the nozzle with time (water molecules 8 evaporated). When the time has further elapsed, the water molecule 4 within the nozzle transfers in the direction of the ejection orifice 1. At this time, the free polymer 7 having hydroxyl groups, which is forming a hydrogen bond with the water molecule 4, also transfers together with the water molecule 4 in the direction of the ejection orifice 1.

FIG. 1C illustrates a state after the time has still further elapsed. As illustrated in FIG. 1C, the free polymer 7 having hydroxyl groups, which is forming a hydrogen bond with the water molecule 4, seeps out through the ejection orifice 1 and adheres to an orifice face 3 centering on the ejection orifice 1. The free polymer 7 having hydroxyl groups right after having adhered to the orifice face 3 keeps a dissolved state by the bonded water molecule 4. Since the bonded water molecule 4 evaporates with time, however, the free polymer 7 having hydroxyl groups loses its solubility to stick as a deposit on the periphery of the ejection orifice 1.

The phenomenon that the polymer in the ink seeps out through the ejection orifice of the recording head occurs according to the above-described mechanism. As a result, it is considered that the ejection characteristics are deteriorated by the presence of the deposit.

Incidentally, whether all the free polymer having hydroxyl groups present in the ink according to the present invention forms the hydrogen bond with the water molecules or nor is unknown. It is however inferred that majority of the polymer having hydroxyl groups is present in the state of forming a hydrogen bond with the water molecule in order to more stably be present in the ink.

As described above, the polymer to cause seeping out is a polymer having hydroxyl groups that is not adsorbed on the pigment, i.e., a free polymer having hydroxyl groups. As a consequence, it is supposed that the deterioration of the ejection characteristics can be inhibited by reducing the content of the free polymer having hydroxyl groups in the ink.

The present inventors have thus carried out an investigation with a view toward reducing the free polymer having hydroxyl groups in the ink to the utmost within such a range that the ejection characteristics are not deteriorated and the scratch resistance and highlighter resistance are sufficiently achieved. Specifically, an investigation has been made as to optimization of the content of the dispersant, the performance of physical means such as ultrafiltration and centrifugation, and the like. A further investigation has been made about the condition that adsorbability between the pigment and the dispersant is enhanced by making the hydrophobicity of monomers making up the dispersant higher to prevent the generation of the free polymer having hydroxyl groups to the utmost.

As a result, it has been found that when the content (mass %) of the free polymer having hydroxyl groups present in an ink is 0.20 mass % or less based on the total mass of the ink, such seeping out phenomenon as described above can be inhibited, and the ejection characteristics can be made excellent.

The present inventors have carried out a further investigation. As a result, it has been found that when an ink, in which the content (mass %) of the free polymer having hydroxyl groups is 0.20 mass % or less based on the total mass of the ink, is stored for a long period of time, the following problem occurs. More specifically, it has been found that generation of aggregates and changes of physical properties such as surface tension and viscosity may be caused in some cases, i.e., storage stability may be deteriorated.

The present inventors infer that the cause of such a phenomenon as described above is as follows. When an ink using, as a dispersant for a pigment, a polymer high in hydrophilicity like a polymer having hydroxyl groups is stored for a long period of time, there is a tendency to increase the polymer that is desorbed from the surface of the pigment high in hydrophobicity to be present in an aqueous medium high in hydrophilicity compared with the polymer that is present in a state adsorbed on the surface of the pigment. Therefore, when the ink using, as a dispersant, the polymer having hydroxyl groups is stored for a long period of time, the polymer becomes easy to be desorbed from the surface of the pigment compared with a polymer having no hydroxyl group.

For inks using a conventional resin dispersion pigment, no investigation has been made about the free polymer having hydroxyl groups in the ink and the content thereof, and hence the content of the free polymer having hydroxyl groups has not been controlled. As a result, adsorption/desorption between the pigment and the polymer takes place, since another free polymer having hydroxyl groups originally present in the ink is adsorbed again on the surface of the pigment even when the polymer is desorbed from the surface of the pigment, whereby the ink does not lose dispersion stability.

However, as described above, the free polymer having hydroxyl groups needs to be reduced to the utmost for inhibiting the seeping out phenomenon. It is thus necessary to remove the free polymer having hydroxyl groups in the ink by ultrafiltration or the like. On one hand, this condition can be regarded as being such that it is hard to cause the phenomenon that the free polymer having hydroxyl groups is adsorbed again on the surface of the pigment after the polymer is desorbed from the surface of the pigment. It is inferred that this resulting conflicting conditions cause deterioration of the storage stability of the ink using the polymer having hydroxyl groups as a dispersant when the ink is stored for a long period of time.

The present inventors have thus carried out an investigation as to the composition of an ink that can inhibit the seeping out phenomenon and does not cause the deterioration of storage stability when the ink is stored for a long period of time. In particular, the present inventors have carried out an investigation as to the content of a free polymer having hydroxyl groups and the relationship between the contents of the free polymer having hydroxyl groups and the pigment.

As a result, it has been found that the above-described problems can be solved at the same time in the following case, thus leading to completion of the present invention. That is, it has been found that the above-described problems can be solved at the same time when the content of the free polymer having hydroxyl groups is 0.20 mass % or less based on the total mass of the ink, and the proportion of the content of the free polymer having hydroxyl groups to the content of the pigment is 2.0 mass % or more. Incidentally, in order to more effectively inhibit the seeping out phenomenon, it is more preferable that the content of the free polymer having hydroxyl groups be 0.15 mass % or less based on the total mass of the ink. It is also preferable from the viewpoint of storage stability that the content (mass %) of the free polymer having hydroxyl groups be 0.08 mass % or more based on the total mass of the ink and the proportion of the content of the free polymer having hydroxyl groups to the content of the pigment be 5.0 mass % or less. Incidentally, the content of the free polymer having hydroxyl groups in the ink can be controlled by ultrafiltration or the like.

<Ink>

The components constituting an ink according to the present invention will hereinafter be described.

(Polymer having Hydroxyl Groups)

It is essential for the ink according to the present invention to contain a polymer having hydroxyl groups. Polymers having hydroxyl groups include acrylic ester polymers obtained by copolymerizing acrylic ester monomers, for example, polymers obtained by copolymerizing a monomer having hydroxyl group(s) with a part of acrylic ester monomers.

Examples of the monomer having hydroxyl group(s) include 2-hydroxyethyl (meth)acrylate, hydroxypropyl (meth)acrylate, polyethylene glycol mono(meth)acrylate and polypropylene glycol mono(meth)acrylate.

As the monomer copolymerized with the monomer having hydroxyl group(s), may be used that commonly used. Examples of the acrylic ester monomer include methyl (meth)acrylate, ethyl (meth)acrylate, n-butyl (meth)acrylate, 2-ethylhexyl (meth)acrylate and cyclohexyl (meth)acrylate. Besides the acrylic ester monomers, any monomer having a double bond copolymerizable with the monomer having hydroxyl group(s) may also be used. Examples thereof include a styrene monomer, vinyl acetate monomer and 1,3-butadiene.

As the polymer having hydroxyl groups, may also be preferably used a polymer obtained by saponifying a vinyl acetate-acrylic ester polymer obtained by copolymerizing an acrylic ester monomer and a vinyl acetate monomer with a strong base such as sodium hydroxide, i.e., a polyvinyl alcohol type polymer.

No particular limitation is imposed on the form of the polymer so far as the scratch resistance and highlighter resistance of an image as well as the ejection characteristics of the ink can be made excellent, which is the fundamental object to be achieved by the addition of the polymer having hydroxyl groups into an ink, and any polymer of linear, branched, random and block copolymers may he used. In order to inhibit a phenomenon that the polymer is desorbed from the surface of a pigment to the utmost, however, the molecular weight of the segment having hydroxyl groups is preferably 20,000 or less.

When the polymer having hydroxyl groups is a copolymer composed of a segment having hydroxyl groups and a segment having no hydroxyl group, such a polymer is preferably a block copolymer, more preferably a block copolymer in which a monomer having hydroxyl group(s) is present at a terminal of the polymer, because the adsorbability of the polymer having hydroxyl groups on the surface of the pigment is enhanced when the hydrophobic portion of the polymer having hydroxyl groups, which is adsorbed on the surface of the pigment, is concentrated on the terminal. When the ink according to the present invention is applied to an ink jet recording method in which an ink is ejected by applying thermal energy to the ink to form an image on a recording medium, the ink tends to show more stable ejection characteristics as the hydrophilicity of the polymer is higher. From this fact, it is particularly preferable to use the polyvinyl alcohol type polymer.

No particular limitation is imposed on the content (mass %) of the polymer having hydroxyl groups in the ink according to the present invention so far as the scratch resistance and highlighter resistance of an image as well as the ejection characteristics of the ink can be made excellent, which is the fundamental object. In the present invention, however, the content of the free polymer having hydroxyl groups, which is the cause of the seeping out phenomenon, is preferably reduced to such an extent that the dispersion stability is not impaired. Accordingly, the content (mass %) of the polymer having hydroxyl groups in the ink is preferably from 5.0% to 100.0% , more preferably from 7.0% to less than 20.0%, further more preferably from 10.0% to 15.0% based on the total mass of the ink when the content (mass %) of the pigment in the ink is regarded as 100 based on the total mass of the ink. The content (mass %) of the polymer having hydroxyl groups is preferably less than 1.0 mass %, more preferably less than 0.8 mass %, further more preferably 0.6 mass % or less based on the total mass of the ink.

Incidentally, as for the resin dispersion pigment, the polymer is only physically adsorbed on the surface of the pigment, so that the polymer is easy to be desorbed from the surface of the pigment compared with a microcapsule type pigment or a pigment of the type that a polymer is chemically bonded to the surface of the pigment. Accordingly, in order to retain storage stability when the ink is stored for a long period of time, the content (mass %) of the free polymer having hydroxyl groups is preferably 40.0% or more, more preferably 45.0% or more, based on the total content (mass %) of the polymers contained in the ink.

In the present invention, the content of the free polymer having hydroxyl groups in the ink somewhat varies according to the structure of the polymer and the pigment used together with the polymer, and the like. In this case, however, the content may be suitably controlled by ultrafiltration or the like.

(Content of Free Polymer having Hydroxyl Groups in Ink)

In the present invention, the content of the free polymer having hydroxyl groups in the ink can be measured in accordance with the following method. The present invention is not limited to the following method, and a value measured by any other method may be used.

An ink is centrifuged under conditions of 400,000 G and 16 hours, 95 mass % of a liquid in a supernatant portion is taken out. Thereafter, the resultant liquid is subjected to acid dipping to take out a free polymer. The resultant free polymer is then dried to solid to determine the amount of the solid matter. The content of the free polymer based on the total mass of the ink is then found from the proportion to the charged amount. In this method, fine pigment particles may be contained in the liquid of the supernatant portion taken out after the centrifugation under the above-described conditions in some cases. In the present invention, however, the solid matter obtained by conducting the acid dipping by the above-described procedure is substantially regarded as solid matter of the free polymer because the amount of the pigment contained is very small. When the polymer in the ink is comprised of only the polymer having hydroxyl groups, the solid matter of this free polymer is solid matter of the free polymer having hydroxyl groups, and the content (mass %) of the free polymer having hydroxyl groups based on the total mass of the ink is found from this value.

Incidentally, the ink may contain two or more free polymers, for example, the free polymer having hydroxyl groups and a free polymer having no hydroxyl group. In such a case, it is necessary to make the following arrangement in order to determine the content of the free polymer having hydroxyl groups. Namely, the polymer having hydroxyl groups is taken out by using MALDI-TOF/MS (a combination of matrix assisted laser desorption ionization and time-of-flight mass spectrometry), arranging the acid dipping conditions or conducting GPC. The obtained polymer is subjected to component analysis as to monomers constituting the polymer by means of $^{13}C$-NMR, gas chromatography and/or the like. An 1 mass % aqueous solution of a polymer having the same structure as the polymer contained in the ink (standard sample) is prepared on the basis of this analytical result. Thereafter, an aqueous solution containing 1 mass % of the free polymer obtained above and the standard sample are subjected to infrared absorption spectrometry under the same conditions. From the result of the infrared absorption spectrometry as to the standard sample and the aqueous solution containing the free polymer, mass conversion is conducted to find the content (mass %) of the free polymer having hydroxyl groups based on the total mass of the ink.

(Pigment)

Examples of pigments usable in the inks according to the present invention include carbon black and organic pigments. The content (mass %) of the pigment is preferably from 0.1 to 10.0 mass % based on the total mass of the ink.

[Carbon Black]

Examples of usable carbon black include carbon black pigments such as furnace black, lamp black, acetylene black and channel black. It goes without saying that carbon black pigments are not limited to the following pigments.

As specific examples thereof, may be mentioned Raven: 1170, 1190 ULTRA-II, 1200, 1255, 1500, 2000, 3500, 5000, 5250, 5750 and 7000 (all, products of Columbian Carbon Japan Limited); Black Pearls L, Regal: 330R, 400R and 660R, Mogul L, Monarch: 700, 800, 880, 900, 1000, 1100, 1300 and 1400, and Valcan XC-72R (all, products of CABOT CO.); Color Black: FW1, FW2, FW2V, FW18, FW200, S150, S160 and S170, Printex: 35, U, V, 140U and 140V, and Special Black: 4, 4A, 5 and 6 (all, products of Degussa AG); and No. 25, No. 33, No. 40, No. 47, No. 52, No. 900, No. 2300, MCF-88, MA7, MA8, MA100 and MA600 (all, products of MITSUBISHI CHEMICAL CORPORATION).

Besides the above pigments, any carbon black conventionally known may be used. Magnetic fine particles such as magnetite and ferrite, titanium black, and the like may also be used as black pigments.

[Organic Pigment]

The organic pigments specifically include the following pigments, such as insoluble azo pigments such as Toluidine Red, Toluidine Maroon, Hansa Yellow, Benzidine Yellow and Pyrazolone Red; soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; indigo pigments; condensed azo pigments; thioindigo pigments; Flavanthrone Yellow; Acylamide Yellow; Quinophthalone Yellow; Nickel Azo Yellow; Copper Azomethine Yellow; Perinone Orange; Anthrone Orange; Dianthraquinonyl Red; Dioxazine Violet; etc.

When organic pigments are indicated by COLOR INDEX (C.I.) numbers, the following pigments may be exemplified. It goes without saying that conventionally known organic pigments may also he used in addition to the following pigments.

C.I. Pigment Yellow: 12, 13, 14, 17, 20, 24, 74, 83, 86, 93, 109, 110, 117, 120, 125, 128, 137, 138, 147, 148, 151, 153, 154, 166 and 168; C.I. Pigment Orange: 16, 36, 43, 51, 55, 59 and 61; C.I. Pigment Red: 9, 48, 49, 52, 53, 57, 97, 122, 123, 149, 168, 175, 176, 177, 180, 192, 215, 216, 217, 220, 223, 224, 226, 227, 228, 238 and 240; C.I. Pigment Violet: 19, 23, 29, 30, 37, 40 and 50; C.I. Pigment Blue: 15, 15:3, 15:1, 15:4, 15:6, 22, 60 and 64; C.I. Pigment Green: 7 and 36; and C.I. Pigment Brown 23, 25 and 26.

(Dispersant)

In the inks according to the present invention, it is essential to use the polymer having hydroxyl groups as a dispersant in consideration of scratch resistance, highlighter resistance and ejection characteristics. Further, any other polymer may be used as a dispersant in the inks according to the present invention so far as the effect by adding them is achieved, and the objects and effects of the present invention are not impaired.

As another dispersant, is preferably used that capable of stably dispersing the pigment in an aqueous medium by an action of an anionic group. For example, the following dispersants may be used.

Specific examples thereof include styrene-acrylic acid copolymers, styrene-acrylic acid-alkyl acrylate terpolymers and salts thereof; styrene-maleic acid copolymers, styrene-maleic acid-alkyl acrylate terpolymers and salts thereof; styrene-methacrylic acid copolymers, styrene-methacrylic acid-alkyl acrylate terpolymers and salts thereof; styrene-maleic acid half ester copolymers, vinylnaphthalene-acrylic acid copolymers, vinylnaphthalene-maleic acid copolymers, styrene-maleic anhydride maleic acid half ester terpolymers and salts thereof.

The dispersant used in the present invention preferably has a weight average molecular weight ranging from 1,000 to 30,000, more preferably from 3,000 to 15,000.

(Aqueous Medium)

In the inks according to the present invention, an aqueous medium, which is water, or a mixed solvent of water and any of various water-soluble organic solvents, may be used.

No particular limitation is imposed on the water-soluble organic solvent so far as it is soluble in water, and the following solvents may be used.

Polyhydric alcohols, in which hydroxyl groups are bonded to saturated carbon atoms, such as 1,5-pentanediol, 1,2-hexanediol, 1,6-hexanediol, 1,2,6-hexanetriol, 1,1,1-trimethylolpropane and glycerol; monohydric alkyl alcohols having 1 to 4 carbon atoms, such as ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol and thiodiglycol; lower alkyl ether acetates such as polyethylene glycol monomethyl ether acetate; bishydroxyethyl sulfone; lower alkyl glycol ethers such as ethylene glycol monomethyl (or ethyl, butyl) ether, diethylene glycol monomethyl (or ethyl, butyl) ether and triethylene glycol monomethyl (or ethyl, butyl) ether; lower dialkyl glycol ethers such as triethylene glycol dimethyl (or ethyl) ether and tetraethylene glycol dimethyl (or ethyl) ether; alkanolamines such as monoethanolamine, diethanolamine and triethanolamine; sulfolane; N-methyl-2-pyrrolidone; 2-pyrrolidone; 1,3-dimethyl-2-imidazolidinone.

In the present invention, it is particularly preferable that the ink contains polyethylene glycol having an average molecular weight of from 600 to 1,500, since ejection characteristics, particularly, ejection characteristics when the ink is continuously ejected, can be made excellent. In particular, the content of polyethylene glycol having an average molecular weight of from 600 to 1,500 is preferably 0.5 times or more as much as the content of the pigment (solid content) in the ink.

The content (mass %) of the water-soluble organic solvent is preferably from 3.0 mass % to 50.0 mass % based on the total mass of the ink.

As the water, it is preferable to use deionized water (ion-exchanged water). The content (mass %) of water is preferably from 40.0 mass % to 95.0 mass % based on the total mass of the ink.

(Other Additives)

Besides the above components, a surfactant, an antifoaming agent, a preservative, a mildewproofing agent and the like may be added to the inks used in the present invention, not to mention the addition of a humectant, as needed, to obtain an ink having desired physical properties.

When the resin dispersion pigment is used as a coloring material like the present invention, however, the surfactant tends to be adsorbed on the surface of the pigment. Therefore, when a polymer high in hydrophilicity and easy to be desorbed from the surface of the pigment like the polymer having hydroxyl groups is used as a dispersant, it is preferable to lessen the content of the surfactant in the ink to the utmost. Specifically, the content (mass %) of the surfactant in the ink is preferably 25% or less, more preferably 12.5% or less, when the content (mass %) of the pigment (solid content) in the ink is regarded as 100.

<Ink Jet Recording Method, Ink Cartridge, Recording Unit and Ink Jet Recording Apparatus>

Figure 2:
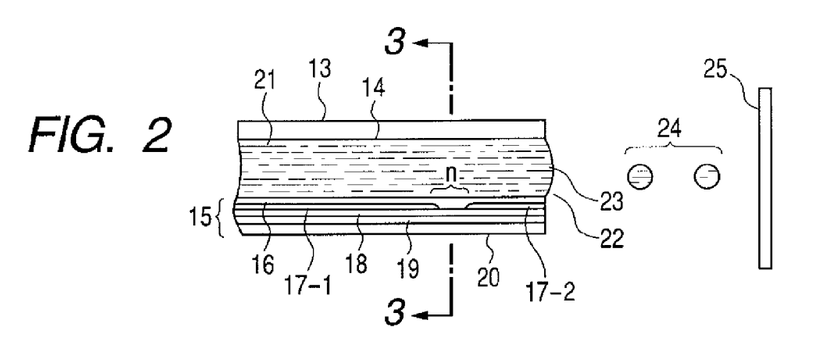
FIG. 2 is a longitudinal cross-sectional view illustrating a recording head.
Figure 3:
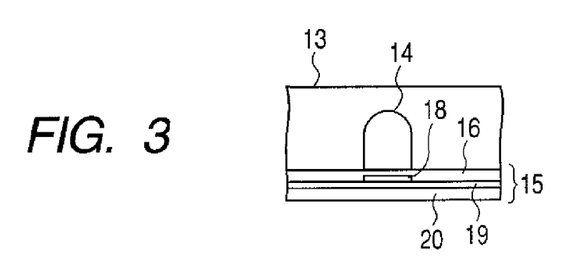
FIG. 3 is a transverse cross-sectional view of the recording head.

An exemplary ink jet recording apparatus will hereinafter be described. First of all, an exemplary construction of a recording head, which is a main component of the ink jet recording apparatus making good use of thermal energy is shown in FIG. 2 and FIG. 3. FIG. 2 is a cross-sectional view of a recording head 13 taken along the flow path of ink, and FIG. 3 is a cross-sectional view taken along line 3-3 in FIG. 2. The recording head 13 is formed by a member having a flow path (nozzle) 14, through which an ink is passed, and a heating element substrate 15. The heating element substrate 15 is composed of a protective layer 16, electrodes 17-1 and 17-2, a heating resistor layer 18, a heat accumulating layer 19 and a substrate 20.

When pulsed electric signals are applied to the electrodes 17-1 and 17-2 of the recording head 13, the heating element substrate 15 rapidly generates heat at the region shown by 'n' to form bubbles in an ink 21 which is in contact with this region. A meniscus 23 of the ink is projected by the pressure of the bubbles, and the ink 21 in the form of droplets 24 is ejected from an ejection orifice 22 through the nozzle 14 toward a recording medium 25.

Figure 4:
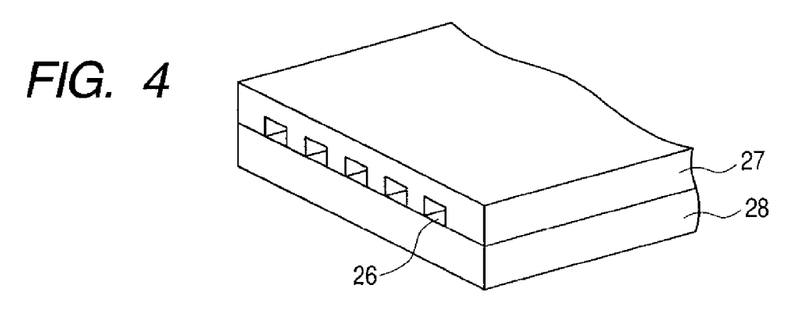
FIG. 4 is a perspective view of a multi-head composed of an array of a number of recording heads as shown in FIG. 3.

FIG. 4 illustrates an appearance of a multi-head composed of an array of a number of heads as shown in FIG. 2. The multi-head is composed of a glass plate 27 having a number of nozzles 26 and a recording head 28 similar to that described in FIG. 2.

Figure 5:
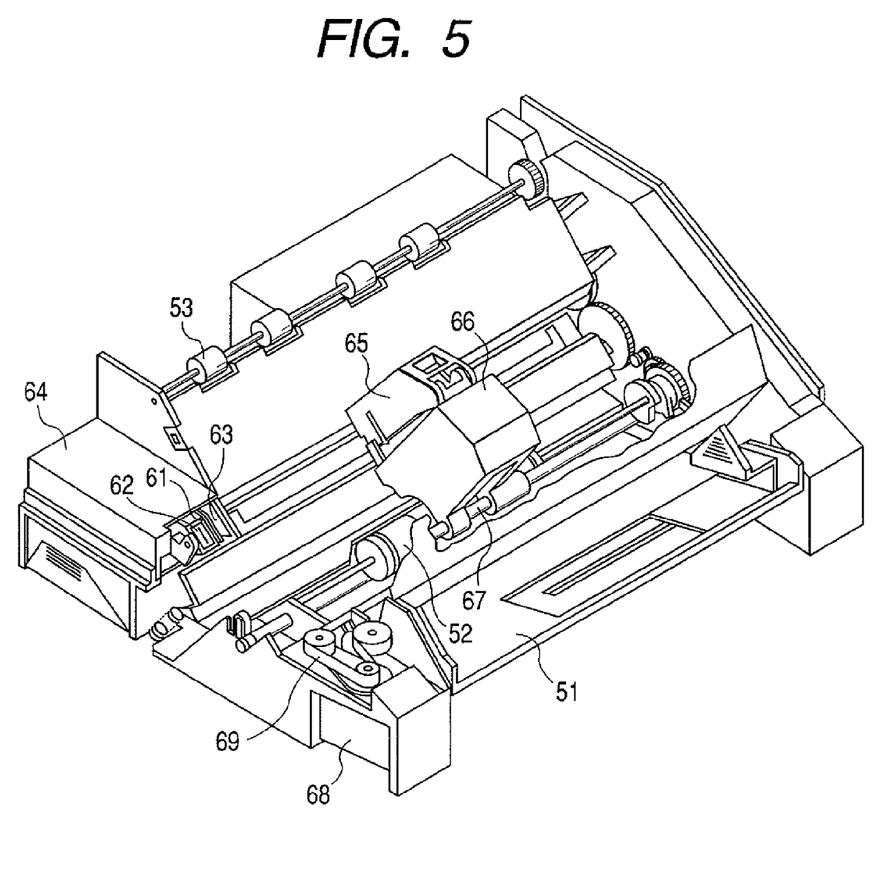
FIG. 5 is a perspective view illustrating an exemplary ink jet recording apparatus.

FIG. 5 is a perspective view illustrating an exemplary ink jet recording apparatus in which a recording head has been incorporated. A blade 61 is a wiping member, one end of which is a stationary end held by a blade-holding member to form a cantilever. The blade 61 is arranged at a position adjacent to a region, in which a recording head 65 operates, and is held in a form protruding into the course through which the recording head 65 is moved.

Reference numeral 62 indicates a cap for the face of ejection orifices of the recording head 65, which is provided at a home position adjacent to the blade 61, and is so constructed that it moves in a direction perpendicular to a direction in which the recording head 65 is moved, and comes into contact with the face of the ejection orifices to cap it. Reference numeral 63 denotes an ink absorbing member provided adjoiningly to the blade 61 and, similar to the blade 61, held in a form protruding into the course through which the recording head 65 is moved. An ejection-recovery portion 64 is constructed by the blade 61, cap 62 and ink absorbing member 63. Water, dust and/or the like are removed from the face of the ink-ejecting orifices by the blade 61 and ink absorbing member 63.

Reference numeral 65 designates the recording head having an ejection-energy-generating means and serving to eject the ink on to a recording medium set in an opposing relation to the ejection orifice face provided with the ejection orifices to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. With such a construction, the recording medium is fed to the position opposite to the ejection orifice face of the recording head 65, and discharged from a discharge section provided with discharge rollers 53 with the progress of recording. The cap 62 in the ejection-recovery portion 64 is receded from the path of motion of the recording head 65 when the recording head 65 is returned to its home position after completion of recording by the recording head 65, and the blade 61 remains protruded into the path of motion. As a result, the ejection orifice face of the recording head 65 is wiped.

When the cap 62 comes into contact with the ejection orifice face of the recording head 65 to cap it, the cap 62 is moved so as to protrude into the path of motion of the recording head 65. When the recording head 65 is moved from its home position to the position at which recording is started, the cap 62 and blade 61 are at the same positions as the positions for the wiping as described above. As a result, the ejection orifice face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection orifice face is wiped in accordance with this movement.

Figure 6:
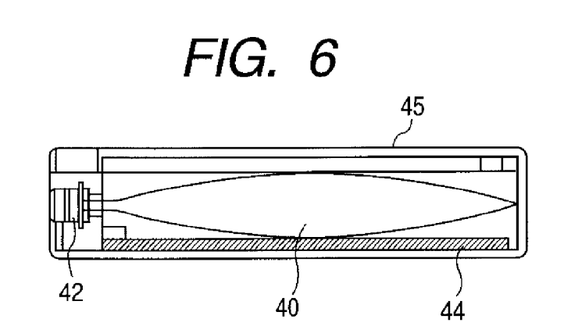
FIG. 6 is a longitudinal cross-sectional view illustrating an ink cartridge.

FIG. 6 illustrates an exemplary ink cartridge in which an ink to be fed to a recording head through an ink-feeding member, for example, a tube is stored. Here, reference numeral 40 designates an ink storage portion storing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the recording head. Reference numeral 44 indicates an absorbing member for receiving a waste ink.

Figure 7:
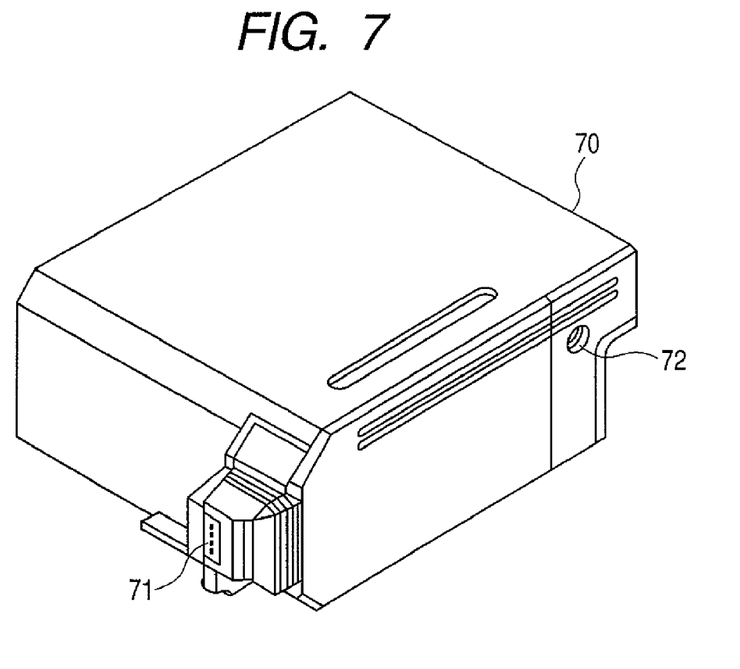
FIG. 7 is a perspective view illustrating an exemplary recording unit.

The ink jet recording apparatus are not limited to the apparatus in which the recording head and the ink cartridge are separately provided. Therefore, an apparatus in which these members are integrally formed as shown in FIG. 7 may also be preferably used. In FIG. 7, reference numeral 70 designates a recording unit, in the interior of which an ink storage portion storing an ink, for example, an ink absorbing member, is contained, and the ink in the ink absorbing member is ejected in the form of ink droplets through a recording head 71 having a plurality of ejection orifices. The ink storage portion may be constructed by a bag for the ink, in the interior of which a spring or the like is provided, without using the ink absorbing member. Reference numeral 72 indicates an air passage for communicating the interior of the recording unit 70 with the atmosphere. This recording unit 70 is used in place of the recording head 65 shown in FIG. 5, and is detachably installed on the carriage 66.

Figure 8:
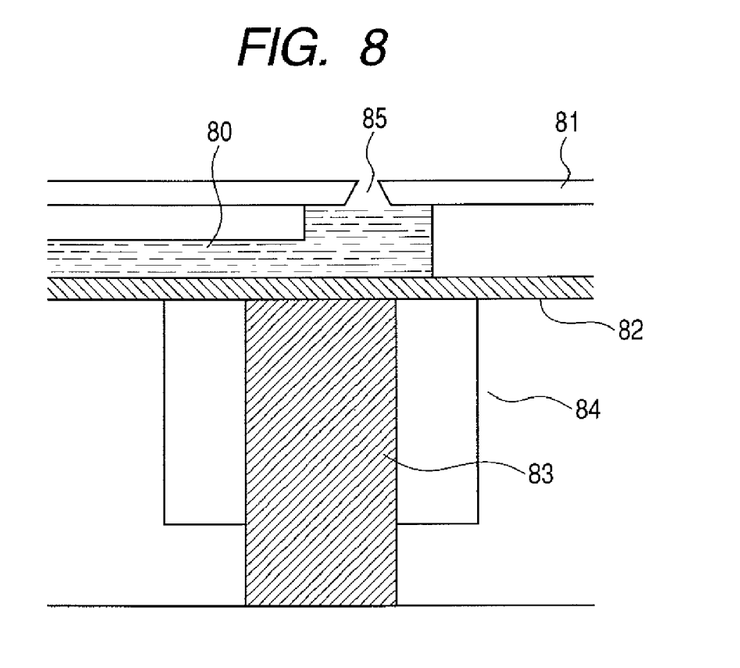
FIG. 8 typically illustrates the construction of an exemplary recording head.

An ink jet recording apparatus making good use of mechanical energy will now be described. The apparatus is equipped with a nozzle-forming substrate having a plurality of nozzles, pressure-generating devices composed of a piezoelectric material and an electric conductive material, and an ink filled around the pressure-generating devices and features a recording head in which the pressure-generating devices are changed by applying a voltage to eject droplets of the ink from ejection orifices. FIG. 8 typically illustrates an example of the construction of the recording head. The recording head is constructed by an ink flow path 80 communicating with an ink chamber, an orifice plate 81, a vibration plate 82 for applying a pressure to the ink, a piezoelectric element 83 bonded to the vibration plate 82 undergoing a change according to an electric signal, and a substrate 84 adapted to support and fix the orifice plate 81, the vibration plate 82 and the like thereon. The vibration plate 82 bonded to the piezoelectric element 83 is deformed by strain stress generated by applying a pulsed voltage to the piezoelectric element 83 to pressurize the ink in the ink flow path 80, thereby ejecting ink droplets from the ejection orifice 85 of the orifice plate 81. Such a recording head can be used by incorporating it into an ink jet recording apparatus similar to that illustrated in FIG. 3.

EXAMPLES

The present invention will hereinafter be described more specifically by the following Examples and Comparative Examples. However, the present invention is not limited by these examples so far as the subject matter of the present invention is not overstepped. Incidentally, all designations of "part" or "parts" and "%" as will be used in the following examples mean part or parts by mass and mass % unless expressly noted.

<Preparation of Pigment Dispersion Solution>

In the preparation of the following pigment dispersion solutions, the following carbon black and polymers were used. However, the present invention is not limited thereto.

Carbon black: one having a specific surface area of 210 $m^2/g$ and a DBP oil absorption of 74 ml/100 g.

Polymer A: a polymer obtained by saponifying and neutralizing polyvinyl acetate-b-poly (benzyl methacrylate-co-acrylic acid) (compositional (molar) ratio: 20:60:20) having a weight average molecular weight of 8,000 with a 10 mass % aqueous solution of potassium hydroxide.

Polymer B: a polymer obtained by neutralizing poly(styrene-co-acrylic acid) (compositional (molar) ratio: 70:30) having a weight average molecular weight of 12,000 with a 10 mass % aqueous solution of potassium hydroxide.

Polymer C: a polymer obtained by neutralizing poly(2-hydroxyethyl methacrylate)-b-poly(benzyl methacrylate-co-acrylic acid) (compositional (molar) ratio: 20:60:20) having a weight average molecular weight of 8,000 with a 10 mass % aqueous solution of potassium hydroxide.

Polymer D: a polymer obtained by saponifying and neutralizing poly(vinyl acetate-co-benzyl methacrylate-co-acrylic acid) (compositional (molar) ratio: 20:60:20) having a weight average molecular weight of 8,000 with a 10 mass % aqueous solution of potassium hydroxide.

(Preparation of Black Pigment Dispersion Solution 1)

Ten parts of carbon black, 1 part of Polymer A and 89 parts of ion-exchanged water were mixed and dispersed for 3 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 µm, thereby preparing Resin Dispersion Black Pigment 1. Water was added to Resin Dispersion Black Pigment 1 to disperse the pigment so as to give a pigment concentration of 10 mass %, thereby preparing a dispersion solution to obtain Black Pigment Dispersion Solution 1 in accordance with the above-described process. The resultant Black Pigment Dispersion Solution 1 was subjected to ultrafiltration to adjust the content of the free polymer having hydroxyl groups. The mass ratio (pigment:Polymer A) of the content of the pigment to the content of Polymer A in Black Pigment Dispersion Solution 1 was 100:8.

(Preparation of Black Pigment Dispersion Solution 2)

Ten parts of carbon black, 2 parts of Polymer A, 2 parts of Polymer B and 86 parts of ion-exchanged water were mixed and dispersed for 3 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 µm, thereby preparing Resin Dispersion Black Pigment 2. Water was added to Resin Dispersion Black Pigment 2 to disperse the pigment so as to give a pigment concentration of 10 mass %, thereby preparing a dispersion solution to obtain Black Pigment Dispersion Solution 2 in accordance with the above-described process. The resultant Black Pigment Dispersion Solution 2 was subjected to ultrafiltration to adjust the content of the free polymer having hydroxyl groups. In order to find the mass ratio of the content of the pigment to the content of Polymer A in Black Pigment Dispersion Solution 2, the following process was performed. After Black Pigment Dispersion Solution 2 obtained above was dried to solid, the solid was dissolved in tetrahydrofuran to obtain a solution. Thereafter, the resultant solution was filtered under pressure through a microfilter (product of Fuji Photo Film Co., Ltd.) having a pore size of 3.0 µm to separate the solution into the pigment and a solution containing the polymers. The solution containing the polymers was subjected to GPC (gel permeation chromatography) to separately take out Polymer A and Polymer B. The mass ratio (pigment:Polymer A) of the content of the pigment to the content of Polymer A in Black Pigment Dispersion Solution 2 was 100:7.

(Preparation of Black Pigment Dispersion Solution 3)

Ten parts of carbon black, 1 part of Polymer C and 89 parts of ion-exchanged water were mixed and dispersed for 3 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 µm, thereby preparing Resin Dispersion Black Pigment 3. Water was added to Resin Dispersion Black Pigment 3 to disperse the pigment so as to give a pigment concentration of 10 mass %, thereby preparing a dispersion solution to obtain Black Pigment Dispersion Solution 3 in accordance with the above-described process. The resultant Black Pigment Dispersion Solution 3 was subjected to ultrafiltration to adjust the content of the free polymer having hydroxyl groups. The mass ratio (pigment:Polymer C) of the content of the pigment to the content of Polymer C in Black Pigment Dispersion Solution 3 was 100:9.

(Preparation of Black Pigment Dispersion Solution 4)

Ten parts of carbon black, 1 part of Polymer A and 89 parts of ion-exchanged water were mixed and dispersed for 4 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 µm, thereby preparing Resin Dispersion Black Pigment 4. Water was added to Resin Dispersion Black Pigment 4 to disperse the pigment so as to give a pigment concentration of 10 mass %, thereby preparing a dispersion solution to obtain Black Pigment Dispersion Solution 4 in accordance with the above-described process. The resultant Black Pigment Dispersion Solution 4 was subjected to ultrafiltration to adjust the content of the free polymer having hydroxyl groups. The mass ratio (pigment:Polymer A) of the content of the pigment to the content of Polymer A in Black Pigment Dispersion Solution 4 was 100:9.

(Preparation of Black Pigment Dispersion Solution 5)

Ten parts of carbon black, 2 parts of Polymer C and 88 parts of ion-exchanged water were mixed and dispersed for 2 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 µm, thereby preparing Resin Dispersion Black Pigment 5. Water was added to Resin Dispersion Black Pigment 5 to disperse the pigment so as to give a pigment concentration of 10 mass %, thereby preparing a dispersion solution to obtain Black Pigment Dispersion Solution 5 in accordance with the above described process. The resultant Black Pigment Dispersion Solution 5 was subjected to ultrafiltration to adjust the content of the free polymer having hydroxyl groups. The mass ratio (pigment:Polymer C) of the content of the pigment to the content of Polymer C in Black Pigment Dispersion Solution 5 was 100:15.

(Preparation of Black Pigment Dispersion Solution 6)

Ten parts of carbon black, 1 part of Polymer D and 89 parts of ion exchanged water were mixed and dispersed for 4 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 µm, thereby preparing Resin Dispersion Black Pigment 6. Water was added to Resin Dispersion Black Pigment 6 to disperse the pigment so as to give a pigment concentration of 10 mass %, thereby preparing a dispersion solution to obtain Black Pigment Dispersion Solution 6 in accordance with the above-described process. The resultant Black Pigment Dispersion Solution 6 was subjected to ultrafiltration under the same conditions as in Black Pigment Dispersion Solution 4 to adjust the content of the free polymer having hydroxyl groups. The mass ratio (pigment:Polymer D) of the content of the pigment to the content of Polymer D in Black Pigment Dispersion Solution 6 was 100:9.

(Preparation of Black Pigment Dispersion Solution 7)

Ten parts of carbon black, 2.5 parts of Polymer C and 87.5 parts of ion-exchanged water were mixed and dispersed for 2 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 µm, thereby preparing Resin Dispersion Black Pigment 7. Water was added to Resin Dispersion Black Pigment 7 to disperse the pigment so as to give a pigment concentration of 10 mass %, thereby preparing a dispersion solution to obtain Black Pigment Dispersion Solution 7 in accordance with the above-described process. The resultant Black Pigment Dispersion Solution 7 was subjected to ultrafiltration under the same conditions as in Black Pigment Dispersion Solution 5 to adjust the content of the free polymer having hydroxyl groups. The mass ratio (pigment:Polymer C) of the content of the pigment to the content of Polymer C in Black Pigment Dispersion Solution 7 was 100:16.

(Preparation of Black Pigment Dispersion Solution 8)

Ten parts of carbon black, 1 part of Polymer C and 89 parts of ion-exchanged water were mixed and dispersed for 3 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 µm, thereby preparing Resin Dispersion Black Pigment 8. Water was added to Resin Dispersion Black Pigment 8 to disperse the pigment so as to give a pigment concentration of 10 mass %, thereby preparing a dispersion solution to obtain Black Pigment Dispersion Solution 8 in accordance with the above-described process. The resultant Black Pigment Dispersion Solution 8 was subjected to ultrafiltration in such a manner that the content of the free polymer having hydroxyl groups is less than that in Black Pigment Dispersion Solution 3, thereby adjusting the content of the free polymer having hydroxyl groups. The mass ratio (pigment:Polymer C) of the content of the pigment to the content of Polymer C in Black Pigment Dispersion Solution 8 was 100:9.

(Preparation of Black Pigment Dispersion Solution 9)

Ten parts of carbon black, 3 parts of Polymer A and 87 parts of ion-exchanged water were mixed and dispersed for 3 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 μm, thereby preparing Resin Dispersion Black Pigment 9. Water was added to Resin Dispersion Black Pigment 9 to disperse the pigment so as to give a pigment concentration of 10 mass %, thereby preparing a dispersion solution to obtain Black Pigment Dispersion Solution 9 in accordance with the above-described process. The resultant Black Pigment Dispersion Solution 9 was subjected to ultrafiltration under the same conditions as in Black Pigment Dispersion Solution 1 to adjust the content of the free polymer having hydroxyl groups. The mass ratio (pigment:Polymer A) of the content of the pigment to the content of Polymer A in Black Pigment Dispersion Solution 9 was 100:17.

<Preparation of Ink>

After the components shown in the following Table 1 and Table 2 were mixed and sufficiently stirred, the resultant respective mixtures were filtered under pressure through a microfilter (product of Fuji Photo Film Co., Ltd.) having a pore size of 1.0 μm, thereby preparing Inks 1 to 12.

<Quantitative Determination of Free Polymer having Hydroxyl Groups>

The content (mass %) of the free polymer having hydroxyl groups in each ink was determined in accordance with the following method. The results are shown in Table 1 and Table 2.

The ink was centrifuged under conditions of 400,000 G and 16 hours, and 95 mass % of the liquid in the supernatant portion was taken out. Thereafter, the resultant liquid was subjected to acid dipping to take out the free polymer. The resultant free polymer was dried to solid, and the amount of the solid was determined. The content of the free polymer based on the total mass of the ink was then found from the proportion to the charged amount.

Incidentally, with respect to Ink 3 containing 2 polymers in the ink, the content of the free polymer having hydroxyl groups in the ink was determined by performing the following process in addition to the above-described procedure. Namely, the structure of Polymer A was determined by a method known per se in the art, and a 1 mass % aqueous solution of Polymer A (standard sample) was prepared. Thereafter, an aqueous solution containing 1 mass % of the free polymer obtained above and the standard sample were subjected to infrared absorption spectrometry under the same conditions. From the result of the infrared absorption spectrometry as to the standard sample and the aqueous solution containing the free polymer, mass conversion was conducted to find the content (mass %) of the free polymer having hydroxyl groups based on the total mass of the ink.

TABLE 1

|  |  | Ink 1 | Ink 2 | Ink 3 | Ink 4 | Ink 5 | Ink 6 |
|---|---|---|---|---|---|---|---|
| Coloring material | Black Pigment Dispersion Solution 1 |  | 40.0 |  | 40.0 |  | 30.0 |
|  | Black Pigment Dispersion Solution 2 |  |  | 40.0 |  |  |  |
|  | Black Pigment Dispersion Solution 3 | 40.0 |  |  |  |  |  |
|  | Black Pigment Dispersion Solution 4 |  |  |  |  | 40.0 |  |
|  | Black Pigment Dispersion Solution 5 |  |  |  |  |  |  |
|  | Black Pigment Dispersion Solution 6 |  |  |  |  |  |  |
|  | Black Pigment Dispersion Solution 7 |  |  |  |  |  |  |
|  | Black Pigment Dispersion Solution 8 |  |  |  |  |  |  |
|  | Black Pigment Dispersion Solution 9 |  |  |  |  |  |  |
| Water-soluble organic solvent | Glycerol |  |  |  | 5.0 |  | 10.0 |
|  | Diethylene glycol | 10.0 | 10.0 | 10.0 | 5.0 | 10.0 |  |
|  | Polyethylene glycol (*1) | 2.0 | 2.0 | 2.0 | 2.0 |  | 2.0 |
| Surfactant | Acetylenol EH (*2) | 0.1 | 0.1 | 0.1 | 0.1 | 0.1 | 0.1 |
| Ion-exchanged water |  | 47.9 | 47.9 | 47.9 | 47.9 | 49.9 | 57.9 |
| Content of pigment [mass %] |  | 4.0 | 4.0 | 4.0 | 4.0 | 4.0 | 3.0 |
| Content of free polymer having hydroxyl groups [mass %] |  | 0.08 | 0.20 | 0.18 | 0.20 | 0.15 | 0.15 |
| Content of polymer having hydroxyl groups [mass %] |  | 0.36 | 0.32 | 0.28 | 0.32 | 0.36 | 0.32 |
| Content of polymer [mass %] |  | 0.36 | 0.32 | 0.68 | 0.32 | 0.36 | 0.32 |
| Content of free polymer having hydroxyl groups/Content of pigment × 100 [%] |  | 2.0 | 5.0 | 4.5 | 5.0 | 3.8 | 5.0 |
| Content of polymer having hydroxyl groups/Content of pigment × 100 [%] |  | 9.0 | 8.0 | 7.0 | 8.0 | 9.0 | 10.7 |
| Content of free polymer having hydroxyl groups/Content of polymer × 100 [%] |  | 22.2 | 62.5 | 26.5 | 62.5 | 41.7 | 46.9 |

(*1) Average molecular weight: 1,000.
(*2) Acetylene glycol ethylene oxide adduct (product of Kawaken Fine Chemicals Co., Ltd.).

TABLE 2

|  |  | Ink 7 | Ink 8 | Ink 9 | Ink 10 | Ink 11 | Ink 12 |
|---|---|---|---|---|---|---|---|
| Coloring material | Black Pigment Dispersion Solution 1 |  |  |  |  |  |  |
|  | Black Pigment Dispersion Solution 2 |  |  |  |  |  |  |

TABLE 2-continued

|  |  | Ink | | | | | |
|---|---|---|---|---|---|---|---|
|  |  | 7 | 8 | 9 | 10 | 11 | 12 |
|  | Black Pigment Dispersion Solution 3 |  |  |  |  |  |  |
|  | Black Pigment Dispersion Solution 4 |  |  |  | 40.0 |  |  |
|  | Black Pigment Dispersion Solution 5 | 40.0 |  |  |  |  |  |
|  | Black Pigment Dispersion Solution 6 |  | 40.0 |  |  |  |  |
|  | Black Pigment Dispersion Solution 7 |  |  | 40.0 |  |  |  |
|  | Black Pigment Dispersion Solution 8 |  |  |  |  | 40.0 |  |
|  | Black Pigment Dispersion Solution 9 |  |  |  |  |  | 40.0 |
| Water-soluble | Glycerol |  |  |  |  |  |  |
| organic solvent | Diethylene glycol | 10.0 | 10.0 | 10.0 | 10.0 | 10.0 | 10.0 |
|  | Polyethylene glycol (*1) |  |  |  | 2.0 | 2.0 | 2.0 |
| Surfactant | Acetylenol EH (*2) | 0.1 | 0.1 | 0.1 | 0.1 | 0.1 | 0.1 |
| Ion-exchanged water |  | 49.9 | 49.9 | 49.9 | 47.9 | 47.9 | 47.9 |
| Content of pigment [mass %] |  | 4.0 | 4.0 | 4.0 | 4.0 | 4.0 | 4.0 |
| Content of free polymer having hydroxyl groups [mass %] |  | 0.15 | 0.17 | 0.19 | 0.15 | 0.05 | 0.30 |
| Content of polymer having hydroxyl groups [mass %] |  | 0.60 | 0.36 | 0.64 | 0.36 | 0.36 | 0.68 |
| Content of polymer [mass %] |  | 0.60 | 0.36 | 0.64 | 0.36 | 0.36 | 0.68 |
| Content of free polymer having hydroxyl groups/Content of pigment × 100 [%] |  | 3.8 | 4.3 | 4.8 | 3.8 | 1.3 | 7.5 |
| Content of polymer having hydroxyl groups/Content of pigment × 100 [%] |  | 15.0 | 9.0 | 16.0 | 9.0 | 9.0 | 17.0 |
| Content of free polymer having hydroxyl groups/Content of polymer × 100 [%] |  | 25.0 | 47.2 | 29.7 | 41.7 | 13.9 | 44.1 |

(*1) Average molecular weight: 1,000.
(*2) Acetylene glycol ethylene oxide adduct (product of Kawaken Fine Chemicals Co., Ltd.).

<Evaluation>
(Seeping Out Phenomenon)

Each of the inks obtained above was stored into an ink cartridge, and the ink cartridge was installed at the position of the cyan ink of a modified ink jet recording apparatus "PIXUS 860i" (manufactured by Canon Inc.). After a head cleaning operation was then conducted twice to confirm that the ink has reached an ejection orifice, the main power of the ink jet recording apparatus was turned off. After the ink jet recording apparatus was left to stand for 2 weeks at room temperature in this state, the recording head was taken out of the apparatus body without turning on the main power while the ink cartridge was kept installed, and the condition in the vicinity of the ejection orifices (nozzles) was observed through a microscope. The recording head was then installed again in the ink jet recording apparatus, the main power was turned on, and the head cleaning operation was conducted once. Thereafter, a nozzle check pattern was recorded. The ink was evaluated as to the seeping out phenomenon by the condition of the nozzles and the nozzle check pattern. The evaluation criteria of the seeping out phenomenon were as follows. The results of the evaluation are shown in Table 3.

[Evaluation Criteria of Seeping Out Phenomenon]

A: No seeping out phenomenon was observed on all nozzles, and recording failure was not recognized on the nozzle check pattern.

B: The seeping out phenomenon was observed on less than 1% of all nozzles, but recording failure was not recognized on the nozzle check pattern.

C: The seeping out phenomenon was observed on 1% or more and less than 5% of all nozzles, and recording failure was recognized on the nozzle check pattern in some of the nozzles.

D: The seeping out phenomenon was observed on 5% or more of all nozzles, and recording failure was recognized on the nozzle check pattern.

(Storage Stability)

Each of the inks obtained above was placed in a shot bottle, and the shot bottle was closely sealed with a cap and stored for one month in an oven of 60° C. After the shot bottle was then taken out of the oven and left to stand until the temperature of the bottle was cooled to ordinary temperature, the bottle was caused to stand with the cap being downside to visually observe the amount and size of the solid deposited on the bottom of the bottle. The values of physical properties (viscosity, surface tension, average particle size of pigments and absorbance characteristics) of the ink were measured. The ink was evaluated as to storage stability by the amount and size of the solids and the physical property values of the ink. The criteria of the storage stability are as follows. The results of the evaluation are shown in Table 3.

A: Solid is scarcely produced.

B: Solid is somewhat produced, but no particular change is recognized on the physical property values of the ink.

C: Solid is produced in a great amount, and any of the physical property values of the ink is changed from the initial value.

TABLE 3

|  |  | Ink | Seeping out phenomenon | Storage stability |
|---|---|---|---|---|
| Example | 1 | 1 | A | B |
|  | 2 | 2 | B | A |
|  | 3 | 3 | B | A |
|  | 4 | 4 | B | A |
|  | 5 | 5 | A | B |
|  | 6 | 6 | A | A |
|  | 7 | 7 | A | B |
|  | 8 | 8 | B | B |
|  | 9 | 9 | B | A |
|  | 10 | 10 | A | B |
| Comparative | 1 | 11 | A | C |
| Example | 2 | 12 | D | A |

(Scratch Resistance)

Each of Inks 1 to 3, 5, 7 and 10 obtained above was stored into an ink cartridge, and the ink cartridge was installed at the position of the black ink of a modified ink jet recording apparatus "PIXUS 860i" (manufactured by Canon Inc.). Thereafter, a solid print portion of 2 cm×2 cm and characters were recorded on a recording medium (PB Paper, product of Canon Inc.) to prepare a recorded matter. Incidentally, the ejection quantity per dot of the ink was within 30 ng±10%.

For the printer driver a default mode was selected.
Kind of paper: plain paper.
Print quality: standard.
Color adjustment: automatic.

After the recorded matter obtained above was left to stand for one minute at room temperature, the recorded portion was rubbed with a finger to visually observe the degree of stain of the solid printed portion, the characters and the finger, thereby evaluating the ink as to the scratch resistance. The criteria of the scratch resistance were as follows. The results of the evaluation are shown in Table 4.

[Evaluation Criteria of Scratch Resistance]

A: Scraping of the recorded portions is scarcely conspicuous at both solid-printed area and character printed area, and no finger was soiled.

B: The solid-printed area or character-printed area is scraped off, and the finger was also soiled.

(Highlighter Resistance)

Each of Inks 1 to 3, 5, 7 and 10 obtained above was stored into an ink cartridge, and the ink cartridge was installed at the position of the black ink of a modified ink jet recording apparatus "PIXUS 860i" (manufactured by Canon Inc.). Thereafter, a solid print portion of 2 cm×2 cm and characters were recorded on a recording medium (PB Paper, product of Canon Inc.) to prepare a recorded matter. Incidentally, the ejection quantity per dot of the ink was within 30 ng±10%.

For the printer driver a default mode was selected.
Kind of paper: plain paper.
Print quality: standard.
Color adjustment: automatic.

After the recorded matter obtained above was left to stand for one hour at room temperature, the character-printed area was marked twice under an ordinary writing pressure with a yellow highlighter (Spot Writer, product of Pilot Pen Co., Ltd.), whereby the degree of stain of the recorded matter and the pen point was visually observed to evaluate the ink as to the highlighter resistance. The criteria of the highlighter resistance were as follows. The results of the evaluation are shown in Table 4.

[Evaluation Criteria of Highlighter Resistance]

A: Neither blurring of the recorded portions nor stain of white portions is observed, and the pen point is also not soiled.

B: No stain was observed on the white portions in the recorded matter, but the pen point is slightly soiled.

C: Stain was observed on the white portions in the recorded matter.

(Ejection Characteristics)

Each of Inks 1 to 3, 5, 7 and 10 obtained above was stored into an ink cartridge, and the ink cartridge was installed at the position of the black ink of a modified ink jet recording apparatus "PIXUS 860i" (manufactured by Canon Inc.). Thereafter, a solid print portion having a recording density of 100% in a size of 2 cm×8 cm was recorded on a recording medium (PB Paper, product of Canon Inc.) with a drive frequency varied from 100 Hz to 1 kHz, 5 kHz, 10 kHz and 15 kHz to prepare a recorded matter. Incidentally, the ejection quantity per dot of the ink was within 30 ng±10%.

For the printer driver a default mode was selected.
Kind of paper: plain paper.
Print quality: standard.
Color adjustment: automatic.

The image densities and condition of unevenness of the solid printed images in the recorded matter obtained above, and the condition of ejection failure upon the recording were visually observed to evaluate the ink as to the ejection characteristics. The criteria of the ejection characteristics were as follows. The results of the evaluation are shown in Table 4.

[Evaluation Criteria of Ejection Characteristics]

A: No ejection failure occurs up to 15 kHz, and solid printed images obtained by recording at 15 kHz and 100 Hz are comparable in image density and unevenness when compared with each other.

B: No ejection failure occurs up to 15 kHz, but the solid printed image at 15 kHz is poorer in image density and condition of unevenness when compared with the solid printed image at 100 Hz.

C: No ejection failure occurs up to 10 kHz, but the solid printed image at 15 kHz undergoes unevenness due to the presence of nozzles of ejection failure and occurrence of dot misalignment.

TABLE 4

| | Ink | Scratch resistance | Highlighter resistance | Ejection characteristics |
|---|---|---|---|---|
| Example | 11 | 1 | A | B | A |
| | 12 | 2 | A | B | A |
| | 13 | 3 | A | B | A |
| | 14 | 5 | A | B | B |
| | 15 | 7 | A | A | C |
| | 16 | 10 | A | B | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-314709, filed Oct. 28, 2005, which is hereby incorporated by reference herein in its entirety.

What is claimed is:

1. A method comprising:
providing an aqueous ink, comprising (a) a polymer having a polyvinyl alcohol unit and (b) a pigment, to inhibit a seeping out phenomenon of the polymer having the polyvinyl alcohol unit from an ejection orifice of an ink jet recording head while the aqueous ink is not ejected from the ejection orifice,
wherein the aqueous ink is such that a ratio of (a) a content by mass of polymer that is not adsorbed on the pigment out of the polymer having the polyvinyl alcohol unit to (b) a content by mass of the pigment in the aqueous ink is 2.0% or more,
wherein a content of the polymer that is not adsorbed on the pigment out of the polymer having the polyvinyl alcohol unit is 0.20 mass % or less based on the total mass of the aqueous ink, and
wherein the polymer having the polyvinyl alcohol unit is obtained by saponifying and neutralizing poly(vinyl acetate-co-benzyl methacrylate-co-acrylic acid).

2. The method according to claim 1, wherein a content of the polymer having the polyvinyl alcohol unit in the aqueous ink is from 5.0 to 100 mass % based on the total mass of the aqueous ink when a content of the pigment in the aqueous ink is regarded as 100 mass % based on the total mass of the aqueous ink.

* * * * *